(12) United States Patent
Alms et al.

(10) Patent No.: US 7,304,107 B2
(45) Date of Patent: Dec. 4, 2007

(54) TOUGHENED POLY(ETHYLENE TEREPHTHALATE) COMPOSITIONS

(75) Inventors: Gregory R. Alms, Hockessin, DE (US); Toshikazu Kobayashi, Chadds Ford, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/312,070

(22) Filed: Dec. 20, 2005

(65) Prior Publication Data

US 2006/0142488 A1 Jun. 29, 2006

Related U.S. Application Data

(60) Provisional application No. 60/637,814, filed on Dec. 21, 2004.

(51) Int. Cl.
*C08L 67/00* (2006.01)

(52) U.S. Cl. .................. 524/502; 524/504; 524/513; 525/63; 525/165; 525/170

(58) Field of Classification Search .............. 525/63, 525/170, 165; 524/502, 504, 513
See application file for complete search history.

(56) References Cited

U.S. PATENT DOCUMENTS

| | | |
|---|---|---|
| 4,284,540 A | 8/1981 | Iida et al. |
| 4,753,980 A | 6/1988 | Deyrup |
| 2005/0186438 A1 | 8/2005 | Alms et al. |

FOREIGN PATENT DOCUMENTS

| | | | |
|---|---|---|---|
| EP | 211 649 | | 2/1987 |
| EP | WO 00/15717 | * | 3/2000 |
| WO | WO2004/104099 A2 | | 12/2004 |
| WO | WO2004/104100 A1 | | 12/2004 |

OTHER PUBLICATIONS

Toughened Polyethyelen Terephthalate, disclosed anonymously, Kenneth Mason Publications Ltd., Aug. 1981.

* cited by examiner

*Primary Examiner*—Ana Woodward

(57) ABSTRACT

Toughened poly(ethylene terephthalate) compositions which contain functionalized polymeric tougheners, and wherein the poly(ethylene terephthalate) contains little or no antimony, have superior heat stability and retain their toughness for longer periods at higher temperatures. The compositions are useful for molded and shaped parts, such as mechanical parts, automotive parts and electrical parts.

19 Claims, No Drawings

TOUGHENED POLY(ETHYLENE TEREPHTHALATE) COMPOSITIONS

CROSS REFERENCE TO RELATED APPLICATIONS

This application claims the benefit of priority to U.S. Provisional Application No. 60/637,814, filed Dec. 21, 2004.

FIELD OF THE INVENTION

Toughened poly(ethylene terephthalate) compositions which contain little or no antimony in any form, which is usually introduced as a polymerization catalyst, have superior heat stability and retain their toughness for longer periods at higher temperatures.

TECHNICAL BACKGROUND

Polyesters, including poly(ethylene terephthalate) (PET), are most commonly made by condensation polymerization starting from one or more diols and one or more diacids or diesters. In order to achieve high enough polyester molecular weights in reasonable amounts of time, one or more catalysts is typically added to the polymerization process. Such catalysts in general include those based for example on titanium, antimony, tin or other elements. Some catalysts contain more than one metal, for example Sb is often present with Mn or Zn. In recent times, when making PET, the polymerization catalyst almost always included an antimony compound, such as antimony oxide or sodium antimonate. Relatively recently in some localities such as Japan, especially for PET meant for use in bottles, the toxicity of antimony has become a concern, and other catalysts such as those based on germanium have been utilized for this use.

When used for certain shaped parts and/or when highly reinforced it is sometimes desirable to toughen polyester compositions. PET and other polyester compositions have been most commonly toughened by adding a rubber or rubber-like polymer to the PET, and thoroughly mixing in this rubber so that it is dispersed as small particles within a PET continuous matrix. Usually this "polymeric toughener" has attached (bonded) to it functional groups such as epoxy or carboxylic anhydride, which are usually thought of as being able to react with functional groups on the PET such as carboxyl or hydroxyl end groups, see for instance U.S. Pat. No. 4,753,980. Herein this type of toughener is referred to as a "functionalized polymeric toughener" (FPT).

These toughened PET (TPET) compositions are typically used for forming shaped parts by melt forming processes such as extrusion, injection molding, or blow molding. During manufacture of the TPET and subsequent melt forming operation(s) the TPET is heated above the melting point of the PET, typically about 265-290° C. This heating period is typically desirably limited to that amount of time required to melt form the TPET to prevent thermal degradation, often 1-3 minutes, but sometimes it may be undesirably extended for instance to 5-10 minutes or even longer, because of a malfunction of the melt forming machine or process, or other unscheduled interruption. When this occurs such TPET compositions usually suffer from a decrease in melt viscosity and/or toughness in the resulting product. Therefore methods to improve the heat stability of TPET compositions are desired.

SUMMARY OF THE INVENTION

This invention concerns a toughened poly(ethylene terephthalate) composition which comprises a functionalized polymeric toughener dispersed in a continuous matrix of said poly(ethylene terephthalate) wherein said improvement comprises said poly(ethylene terephthalate) contains less than 50 ppm of antimony.

This invention also concerns a process for melt forming a toughened poly(ethylene terephthalate) composition which comprises a functionalized polymeric toughener dispersed in a continuous matrix of said poly(ethylene terephthalate) wherein said improvement comprises said poly(ethylene terephthalate) contains less than 50 ppm of antimony.

Also disclosed herein are parts made by the above process and/or of the above composition.

DETAILS OF THE INVENTION

Herein several terms are used, and some of them are defined below:

By "poly(ethylene terephthalate)" is meant a polymer in which repeat units derived (at least formally) from terephthalic acid and connected by ester linkages to the main polymer chain and ethylene glycol and connected by ester linkages to the main polymer chain comprise at least 70 mole percent, more preferably at least 80 mole percent and especially preferably at least 90 mole percent of the repeat units in the polymer. The polymer may contain repeat units derived from other monomers such as isophthalic acid and diethylene glycol, and may also contain repeat units connected by other types of groups such as imide and/or amide groups.

By "melt forming" is meant a process of melting the polymer at a temperature at or above its melting point, forming it in the melted state to a desired or predetermined shape, and cooling the polymer thereby solidifying it and retaining that shape.

By a "functionalized polymeric toughener" is meant a polymer that contains at least one type of a reactive functional group which is capable of reacting with a complimentary reactive group which is part of the PET. Typically the complimentary functional group on the PET is carboxyl and/or hydroxyl (end groups), but may be other groups which are either grafted onto the PET or are originally polymerized into the PET as part of relatively small amounts of comonomers that contain the complimentary functional group.

By a PET containing less than a given amount of antimony is meant the measurement (see below for the method) is made on the "pure" PET, that is PET not containing added ingredients such as fillers, pigments, flame retardants, reinforcing agents, crystallization promoters, etc. However the pure PET may contain small amounts (less than 1 weight percent) of compounds normally added to the PET to stabilize it or present for other reasons, such as antioxidants, polymerization catalyst deactivators, polymerization catalyst residues, etc.

Preferably the PET contains less than 25 ppm of antimony, more preferably less than 10 ppm of antimony, and more preferably the antimony level is below the detection limit of the analytical method. Useful catalysts for the PET polymerization in the present invention include germanium or titanium containing catalysts or pumice.

Preferably the PET used herein has a melting point of about 240° C. or more when measured on the second heat by ASTM Method D3418-82, with the peak of the melting endotherm is taken as the melting point. In another preferred PET only terephthalic acid and ethylene glycol (or their reactive equivalents) are used as monomers to form the PET. It is noted that in such polymerizations the PET formed usually has small amounts of repeat units derived from diethylene glycol, which are apparently formed in the polymerization process. The PET preferably has a weight average molecular weight of about 20,000 or more, more preferably about 30,000 or more, when measured by gel permeation chromatography, using appropriate PET standards.

The FPT is a polymer, typically which is an elastomer or has a relatively low melting point, generally <200° C., preferably <150° C., which has attached to it functional groups which can react with the PET. Since PET usually has carboxyl and hydroxyl groups present, these functional groups usually can react with carboxyl and/or hydroxyl groups. Examples of such functional groups include epoxy, carboxylic anhydride, hydroxyl (alcohol), carboxyl, isocyanato, and primary or secondary amino. Preferred functional groups are epoxy and carboxylic anhydride, and epoxy is especially preferred. Such functional groups are usually "attached" to the polymeric toughening agent by grafting small molecules onto an already existing polymer or by copolymerizing a monomer containing the desired functional group when the polymeric tougher molecules are made by copolymerization. As an example of grafting, maleic anhydride may be grafted onto a hydrocarbon rubber (such as an ethylene/propylene copolymer) using free radical grafting techniques. The resulting grafted polymer has carboxylic anhydride and/or carboxyl groups attached to it. An example of a polymeric toughening agent wherein the functional groups are copolymerized into the polymer is a copolymer of ethylene and a (meth)acrylate monomer containing the appropriate functional group. By (meth)acrylate herein is meant the compound may be either an acrylate, a methacrylate, or a mixture of the two. Useful (meth)acrylate functional compounds include (meth)acrylic acid, 2-hydroxyethyl(meth)acrylate, glycidyl(meth)acrylate, and 2-isocyanatoethyl(meth)acrylate. In addition to ethylene and a difunctional (meth)acrylate monomer, other monomers may be copolymerized into such a polymer, such as vinyl acetate, unfunctionalized (meth)acrylate esters such as ethyl (meth)acrylate, n-butyl(meth)acrylate, and cyclohexyl (meth)acrylate. Preferred tougheners include those listed in U.S. Pat. No. 4,753,980, which is hereby included by reference. Especially preferred tougheners are copolymers of ethylene, ethyl acrylate or n-butyl acrylate, and glycidyl methacrylate.

It is preferred that the polymeric toughener contain about 0.5 to about 20 weight percent of monomers containing functional groups, preferably about 1.0 to about 15 weight percent, more preferably about 7 to about 13 weight percent of monomers containing functional groups. There may be more than one type of functional monomer present in the polymeric toughener. It has been found that often the toughness of the composition is increased by increasing the amount of polymeric toughener and/or the amount of functional groups. However, these amounts should preferably not be increased to the point that the composition may crosslink (thermoset), especially before the final part shape is attained. Increasing these amounts may also increase the melt viscosity, and the melt viscosity should also preferably not be increased so much that molding is made difficult. Preferably there is about 3 to about 25 weight percent of the polymeric toughener in the composition, more preferably about 5 to about 20 weight percent, based on the total composition. A mixture of 2 or more polymeric tougheners may be used in the same composition. At least one must contain reactive functional groups, but the other(s) may or may not contain such functional groups. For instance, tougheners which do not contain functional groups include ethylene-n-butyl acrylate copolymer, ethylene/n-butyl acrylate/carbon monoxide copolymer and a plastomeric polyethylene such as Engage® 8180 (an ethylene/1-octene copolymer) or Engage® 7447 (an ethylene/1-butene copolymer), available from the DuPont-Dow Elastomers, Wilmington, Del. USA.

The FPT is preferably a rubber (its melting point and/or glass transition points are below 25° C.) or is somewhat rubber-like, i.e., has a heat of melting (measured by ASTM Method D3418-82) of less than about 10 J/g, more preferably less than about 5 J/g, and/or has a melting point of less than 80° C., more preferably less than about 60° C. Preferably the FPT has a weight average molecular weight of about 5,000 or more, more preferably about 10,000 or more, when measured by gel permeation chromatography using polyethylene standards.

Useful FPTs include:
(a) A copolymer of ethylene, glycidyl (meth)acrylate, and optionally one or more (meth)acrylate esters.
(b) An ethylene/propylene or ethylene/propylene/diene (EPDM) copolymer grafted with an unsaturated anhydride such as maleic anhydride.
(c) A copolymer of ethylene, 2-isocyanatoethyl (meth) acrylate, and optionally one or more (meth)acrylate esters.

Preferred FPTs are (a) and (b) above, and (a) is especially preferred.

Other ingredients normally present in PET compositions, such as reinforcing agents, fillers, pigments, antioxidants, color stabilization agents, flame retardants, crystallization enhancement material(s), plasticizers, polymerization catalyst deactivators, lubricants, antistatic agents, and electrically and/or thermally conductive fillers, and other polymers (besides the FPT) such other polyesters, polyamides, and polycarbonates, may also be present in the composition. Such useful ingredients include fillers/reinforcing agents such as carbon black, carbon fibers, titanium dioxide, glass fibers, milled glass fiber, glass spheres (hollow and solid), minerals such as mica, clay, talc, wollastonite, and other fillers such as aramid fibers. Some of these fillers/reinforcing agents may also have other utilities, such as being pigments also. They may be present in amounts they are usually used in, for instance in compositions which use PET made with antimony polymerization catalysts. For example a useful concentration of other ingredients is about 1% to about 70% by weight, based on the weight filler plus PET. For fillers/reinforcing agents it is preferred that they are about 1% to about 70% by weight, based on the weight filler/reinforcing agent plus PET.

Another way of classifying "other ingredients" is whether these ingredients contain functional groups which readily react (particularly under mixing conditions) with the functional groups of the polymeric toughening agent, component D. Ingredients, particularly "other ingredients" containing complimentary reactive functional groups, are termed "active ingredients" (or "inactive ingredients" if they don't contain such reactive groups) herein. The Table below gives a partial listing of "reactive groups" which may be part of Component D, together with complimentary reactive groups which may be part of active ingredients.

| Reactive Group | Complimentary Groups |
| --- | --- |
| epoxy | Carboxyl, hydroxyl, amino |
| carboxylic anhydride | Hydroxyl, amino |
| amino | Carboxyl, hydroxyl, epoxy, chloro |
| isocyanato | Carboxyl, hydroxyl, amino |
| hydroxyl | Carboxyl, carboxylic anhydride, epoxy |
| chloro, bromo | Amino |

Not included in active ingredients are FPTs. Not active ingredients, and so are inactive ingredients, are polymers having a number average molecular weight of about 5,000 or more, preferably about 10,000 or more, and some or all of whose complimentary end groups may be reactive (with the functional groups of the polymeric toughener). Polymers having reactive groups which are not end groups, and which may or may not have reactive end groups, are active ingredients Useful catalysts for the polymerization of PET herein include those containing germanium, titanium, tin, iron, nickel, aluminum, and minerals such as pumice. Preferred polymerization catalysts are those containing germanium, titanium, and pumice, and especially preferred polymerization catalysts are those containing germanium or pumice. These polymerization catalysts may be used in their normal amount in the preparation of the PET.

The compositions described herein may be made by melt mixing the PET with the FPT and other ingredients using "melt mixing". This may be carried out in a single or multiple passes through a melt mixer such as a single or twin screw extruder, or a kneader. All the ingredients may be added at the back end of the extruder or some may be added in so-called side feeders along the length of the mixing apparatus. It is preferred however that the PET and FPT be added at the rear of the extruder or kneader. Some of the ingredients such as fillers, plasticizers, crystallization nucleating agents, and lubricants (mold release) may be added at one or more downstream points in the extruder, so as to decrease attrition of solids such as fillers, and/or improve dispersion, and/or decrease the thermal history of relatively thermally unstable ingredients, and/or reduce loss of volatile ingredients by vaporization. After the materials are mixed they may be formed (cut) into pellets or other particles suitable for feeding to a melt forming machine. Melt forming can be carried out by the usual methods for thermoplastics, such as injection molding, thermoforming, extrusion, blow molding, or any combination of these methods.

When one or more "active ingredients" are present in the composition, a particular variation of the above mixing procedure is preferred. In this variation, the PET and the FPT, and optionally additional inactive ingredients are mixed in a first mixing step, and any reactive ingredients and optionally inactive ingredients, as described above, are mixed into the intermediate composition containing the IPE in one or more subsequent mixing steps. This can be accomplished in a number of different ways. For instance, the first mixing step can be carried out in a single pass thorough a single or twin screw extruder or other type of mixing apparatus, and then the other ingredients are added during a second pass through a single or twin screw extruder or other mixing apparatus. Alternatively, the first mixing step is carried out in the "back end" (feed end) of a single or twin screw extruder or similar device and then the materials to be added for the second mixing step are added somewhere downstream to the barrel of the extruder, thereby mixing in the materials for the second mixing step. The added materials for the second mixing step may be added by a so-called "side feeder" or "vertical feeder" and/or if liquid by a melt pump. More than one side feeder may be used to introduce different ingredients. As noted above it may be preferable to add inactive ingredients in side and/or vertical feeders for other reasons. The use of an extruder with one or more side and/or vertical feeders is a preferred method of carrying out the first and second mixing steps. If an inactive lubricant is used, it is also preferred that it be added in the second mixing step. If two or more mixing passes are done, the machine(s) for these passes may be the same or different (types). Upon exiting the mixing apparatus the composition may be directly melt formed, for instance by injection molding or by passing through an extrusion die. Alternatively the composition may be formed into pellets or other convenient form for later processing into useful parts as by melt forming.

When a conductive carbon black is present so that the electrical conductivity of the composition is increased relative to a composition not containing the carbon black it is preferred that in a first mixing step mixing the PET, FPT, and optionally other inactive ingredients, to form an intermediate composition, and in a subsequent mixing step introducing and mixing said carbon black, and optionally other ingredients, into the intermediate composition while the intermediate composition is molten. These two mixing steps can be performed as described immediately above in the procedure when an active ingredient is also present.

Useful methods for mixing the ingredients will be found in U.S. Pat. No. 4,753,980, and World Patent Applications 2004104099 and 2004104100, and U.S. patent application Ser. No. 10/943,527 (AD7043), which are all hereby included by reference. In particular the disclosures of where and when to add certain ingredients to the mixing process in World Patent Applications 2004104099 and 2004104100, and U.S. patent application Ser. No. 10/943,527 (AD7043) are especially preferred.

Melt forming may be carried out in any type of apparatus that it used for melt forming thermoplastic, and particularly PET, compositions. These include extrusion, injection molding, blow molding, thermoforming, compression molding, and rotomolding. Preferred forming methods are injection molding, (screw) extrusion, and blow molding. These methods are well known in the art, and methods specifically used previously for PET compositions may be used with the present compositions.

The present compositions are useful in shaped parts such as automotive parts, mechanical parts, electrical parts, and appliance parts. They may be highly reinforced as with a material such as glass fiber.

The compositions described herein are particularly useful as "appearance parts", that is parts in which the surface appearance is important (see for instance World Patent Applications 2004104099 and 2004104100, and U.S. patent application Ser. No. 10/943,527 (AD7043)). This is applicable whether the composition's surface is viewed directly, or whether it is coated with paint or another material such as a metal. Such parts include automotive body panels such as fenders, fascia, hoods, tank flaps and other exterior parts; interior automotive panels; appliance parts such as handles, control panels, chassies (cases), washing machine tubs and exterior parts, interior or exterior refrigerator panels, and dishwasher front or interior panels; power tool housings such as drills and saws; electronic cabinets and housings such as personal computer housings, printer housings, peripheral housings, server housings; exterior and interior panels for vehicles such as trains, tractors, lawn mower decks, trucks, snowmobiles (especially snowmobile hoods), aircraft, boats, and ships; decorative interior panels for buildings; furniture such as office and/or home chairs and tables; and telephones and other telephone equipment. As mentioned above these parts may be painted or they may be left unpainted in the color of the composition. The composition may be colored with pigments and/or dyes, so many color variations are possible. This type of coloration of parts made from the composition is particularly attractive economically, since such parts need not be subsequently coated (painted) in one or more additional steps.

As noted above, the present compositions are more stable at higher temperatures for longer periods of time in the melt to decreases in melt viscosity, and/or a loss of toughness. Other physical properties such as tensile strength and elongation may also not deteriorate as quickly when using PETs containing no or small amounts of Sb. In the Examples below, it can be seen that in PETs made with antimony containing polymerization catalysts, the compositions decreased in viscosity and lost toughness relatively quickly under melt processing conditions. PETs made using other polymerization catalysts eventually decreased in viscosity and toughness, but after much longer time periods, allowing longer residence times in the melt molding machine and/or giving larger margins for "error" in melt processing, often very desirable characteristics.

Analyses for antimony and other elements in the PETs were done before mixing in other ingredients (except for small amounts of antioxidants and polymerization catalyst deactivators which may have been present in the PET, as noted above). Analyses for the presence of other elements were carried out by the same method. Generally speaking analyses for any number of elements may be carried out simultaneously. The PET contain less than about 50 ppm Sb, more preferably less than about 25 ppm Sb, especially preferably less than about 10 ppm Sb, and very preferably less than 1 ppm Sb.

EXAMPLES

Compounding Method A Polymeric compositions were prepared by compounding in 30 mm Werner and Pfleiderer twin screw extruder. All ingredients were blended together and added to the rear (barrel 1) of the extruder except that Nyglos®, Vansil® and other minerals, and the lubricant were side-fed into barrel 6 (of 10 barrels) and the plasticizer was added using a liquid injection pump. Barrel temperatures were set at 290° C. resulting in melt temperatures of 290-350° C. depending on the composition and extruder rate and rpm of the screw.

Molding Method Plaques were molded on a Nissei injection molding machine, Model FN3000, with a 6 oz sized barrel, made by Nissei Plastic Industrial Co., Ltd., Sakakimachi, Nagano 389-0693, Japan. The barrel set temperatures were all 290° C., and the mold temperature was 120° C. The cycle included 15 sec for injection, and the cycle hold time (at 4 min total holdup time (residence time in the machine barrel), HUT) was 10 sec, and for a 15 min HUT, the cycle hold time was about 180 sec. The hold time was adjusted (by measuring holdup time using natural resin and then abruptly changing to a black resin) as needed, by extrapolating the HUT from the normal cycle (4 min HUT).

Melt Viscosity Determined using a Kayness Model 8052 viscometer, Kayness Corp., Morgantown Pa., U.S.A., at 295° C. and a shear rate of 1000/sec, with an orifice which was 1.52 cm (0.600") long and 0.0762 cm (0.030") in diameter. Holdup time was simply the amount of time which elapsed after the sample was added to the viscometer and before the measurement began. Multiple measurements at different holdup times (HUT in the viscometer, the amount of time the PET is in the hot viscometer before the measurement is taken) could be obtained from a single sample.

Instrument Impact Test This test measures the force vs. time as a weighted 1.27 cm (½") diameter hemispherical tipped tup weighing 11.3 kg (25 pound) was dropped from 1.09 m through a 0.32 cm (⅛") thick molded plaque. This gives a nominal tup speed of 4.5 m/sec when striking the plaque. The plaque is clamped on the top and bottom surfaces, both sides of the clamp having colinear 3.81 cm (1.5") diameter holes, and the tup strikes the plaque in the center of these holes. An accelerometer is attached to the tup and the force during the impact is recorded digitally. The total energy to break is calculated from the data, the values reported are the average of three determinations.

In the Examples certain ingredients are used, and they are defined below:

Irganox® 1010—antioxidant available from Ciba Specialty Chemicals, Tarrytown, N.Y. 10591, USA.

Ketjenblack® EC600JD—conductive carbon black from Akzo Nobel Polymer Chemicals, LLC, Chicago, Ill. 60607 USA LCP1—50/50/70/30/320 (molar parts) hydroquinone/4, 4'-biphenol/terephthalic acid/2,6-napthalene dicarboxylic acid/4-hydroxybenzoic acid copolymer, melting point 334° C.

Licowax® PE 520—a polyethylene wax used as a mold lubricant available from Clariant Corp. Charlotte, N.C. 28205, USA. It is reported to have an acid value of 0 mg KOH/g wax.

Loxiol® PTS—a mixture of fatty acid esters (mold release) available from Cognis Corp., Cincinnati, Ohio 45232 USA.

Loxiol® HOB 7119—a mixture of fatty acid esters (mold release) available from Cognis Corp., Cincinnati, Ohio 45232 USA.

Nyglos® 4—average approximately 9 µm length wollastonite fibers with no sizing available from Nyco Minerals, Calgary, AB, Canada.

PET 1—Crystar® 3934—PET homopolymer, IV=0.67, available from E. I. DuPont de Nemours & Co., Inc., Wilmington, Del. 19898 USA, made with an antimony containing catalyst.

PET 2—DT65G grade PET, 0.65 IV, available from Takayasu Corp., Tokyo, Japan, made with a germanium containing catalyst.

PET 3—DT75G grade PET, 0.75 IV, available from Takayasu Corp., Tokyo, Japan, made with a germanium containing catalyst.

PET 4—A PET made with a pumice catalyst.

PET 5—Novapex® PET available from Mitsubishi Chemical Corp. Tokyo, Japan, made with a germanium containing catalyst.

PET 6—TR MB grade PET obtained from Teijin Chemicals Ltd., Chiyoda-ku, Tokyo 100-0011, Japan, made with germanium containing catalyst.

PET 7—MA-1200 grade PET obtained from Unitika Corp., Osaka, Japan, made with germanium containing catalyst.

PET 8—Crystar® 3905—PET homopolymer, available from E. I. DuPont de Nemours & Co., Inc., Wilmington, Del. 19898 USA, made with an antimony containing catalyst.

PET 9—PET homopolymer made with a germanium catalyst.

PET 10—PET homopolymer made with a titanium catalyst.

Plasthall® 809—polyethylene glycol 400 di-2-ethylhexanoate.

Polymer A—ethylene/n-butyl acrylate/glycidyl methacrylate (66/22/12 wt. %) copolymer, melt index 8 g/10 min.

Ultranox® 626—an antioxidant, bis(2,4-di-t-butylphenyl)penterythritol diphosphite, available from GE Specialty Chemicals, Inc., Morgantown, W.V. 26501 USA.

Vansil® HR 325—wollastonite from R. T. Vanderbilt Co., Norwalk, Conn. 06850, USA.

In the Examples, all compositional amounts shown are parts by weight.

Elemental Analyses and Viscosities of PET Polymers

The PET polymers used herein were analyzed for metals and metalloids. Results are given in Table 1 in µg/g (which corresponds to ppm). In the Table some of the results are averages of two or more analyses. Blanks indicate less than 1 ppm present.

Analyses were carried by digesting 3 g of material is placed in a CEM Star® 6 open cavity microwave digestion system (CEM Corp., Matthews, N.C. 28106 USA) for digestion with acid. The microwave added sulfuric and nitric acid and ramped up[ the temperature to allow for total dissolution of the material. The acid mixture was brought to a final volumetric volume of 50 mL with 2% aqueous HCl. The aqueous solution was analyzed by a PerkinElmer Optima® 3300 radial view ICP-AES (PerkinElmer Life and Analytical Sciences, Boston, Mass. 02118, USA).

TABLE 1

| | PET | | | | | | | |
|---|---|---|---|---|---|---|---|---|
| | 1 | 2 | 3 | 4 | 5 | 6 | 7 | 8 |
| Al | | | | 115 | | | | |
| B | 17 | 18 | 22 | 11 | | | 11 | 4 |
| Ba | | | | 3 | | | | |
| Ca | 7 | 6 | 7 | 23 | 3 | 4 | 5 | 4 |
| Co | | | | | | | | 65 |
| Cr | | | | 4 | | | | |
| Cu | | | | 3 | | 1 | | |
| Fe | 3 | 2 | 6 | 33 | 1 | 2 | 1 | |
| K | | | | 710 | | | | |
| Ge | | 15 | 20 | | 28 | 39 | 27 | |
| Mg | | | | 7 | | | | |
| Mn | 87 | | | | | | | 90 |
| Na | 32 | 13 | 31 | 140 | 10 | 8 | 9 | 28 |
| Ni | | | | 3 | | | | |
| P | 69 | 20 | 37 | | 25 | 15 | 41 | 50 |
| Sb | 300 | | | | | | | 165 |
| Si | 8 | 7 | 7 | 495 | 16 | 9 | 4 | 65 |
| Ti | | | | 3 | | | | |
| Zn | 2 | 2 | 2 | 35 | 1 | 16 | 1 | |

In Table 2 the melt viscosities of the PETs (no other ingredients present, except antioxidants) were measured at various holdup times (HUT, in seconds). Results are given in Pa·s.

TABLE 2

| | PET | | | | | | |
|---|---|---|---|---|---|---|---|
| HUT | 1 | 2 | 3 | 4 | 5 | 6 | 7 |
| 330 | | | | 130 | | | |
| 390 | 180 | 113 | 225 | | 186 | 51 | 83 |
| 630 | | | | 125 | | | |
| 690 | 176 | 106 | 209 | | 175 | 46 | 77 |
| 930 | | | | 122 | | | |
| 990 | 171 | 103 | 200 | | 167 | 46 | 75 |
| 1230 | | | | 267 | | | |
| 1290 | 166 | 98 | 190 | | 161 | 42 | 73 |
| 1530 | | | | 411 | | | |
| 1590 | 163 | 98 | 182 | | 155 | 45 | 72 |

Example 1 and Comparative Example A

The compositions shown in Table 3 were prepared by Compounding Method A. They were then tested for melt viscosity and instrumented impact. Results are also given in Table 3.

TABLE 3

| Example | A | 1 |
|---|---|---|
| PET 1 | 66.2 | |
| PET2 | | 66.2 |
| Licowax® PE 520 | 0.5 | 0.5 |
| LCP1 | 2.5 | 2.5 |
| Polymer A | 12.5 | 12.5 |
| Irganox® 1010 | 0.3 | 0.3 |
| Nyglos® 4 | 15 | 15 |
| Plasthall® 809 | 3 | 3 |
| Instrumented impact, J | | |
| 4 min HUT | 35.0 | 27.4 |
| 15 min HUT | 27.3 | 32.8 |
| Viscosity, Pa·s | | |
| 330 sec. HUT | 335 | 263 |
| 630 | 328 | 305 |
| 930 | 285 | 326 |
| 1230 | 255 | 338 |

Examples 2-7

The compositions shown in Table 4 were prepared by Compounding Method A. They were then tested for melt viscosity and instrumented impact. Results are also given in Table 4.

TABLE 4

| | Example | | | | | |
|---|---|---|---|---|---|---|
| | 2 | 3 | 4 | 5 | 6 | 7 |
| PET 2 | 72.2 | 70.2 | | | | |
| PET 3 | | | 72.2 | 70.2 | | |
| PET 7 | | | | | 72.2 | 70.2 |
| Loxiol® PTS | 0.5 | 0.5 | 0.5 | 0.5 | 0.5 | 0.5 |
| LCP1 | 2.5 | 2.5 | 2.5 | 2.5 | 2.5 | 2.5 |
| Polymer A | 13 | 15 | 13 | 15 | 13 | 15 |
| Irganox® 1010 | 0.3 | 0.3 | 0.3 | 0.3 | 0.3 | 0.3 |
| Vansil® HR325 | 6 | 6 | 6 | 6 | 6 | 6 |
| Plasthall® 809 | 3 | 3 | 3 | 3 | 3 | 3 |
| Ketjenblack® EC600JD | 2.5 | 2.5 | 2.5 | 2.5 | 2.5 | 2.5 |
| Instrumented impact, J | | | | | | |

TABLE 4-continued

| | Example | | | | | |
|---|---|---|---|---|---|---|
| | 2 | 3 | 4 | 5 | 6 | 7 |
| 4 min HUT | 35.3 | 48.1 | 48.6 | 49.1 | 50.1 | 50.6 |
| 15 min HUT | 34.5 | 38.9 | 45.7 | 48.1 | 48.9 | 51.6 |
| Viscosity, Pa · s | | | | | | |
| 330 sec. HUT | 420 | 506 | 367 | 404 | 477 | too viscous |
| 630 | 453 | 533 | 421 | 461 | 599 | too viscous |
| 930 | 460 | 543 | 437 | 475 | 640 | 749 |
| 1230 | 453 | 536 | 435 | 472 | 623 | 733 |
| 1530 | 441 | 529 | 419 | 461 | 584 | 745 |

Examples 8-10

The compositions shown in Table 5 were prepared by Compounding Method A. They were then tested for melt viscosity and instrumented impact. Results are also given in Table 5.

TABLE 5

| Example | 8 | 9 | 10 |
|---|---|---|---|
| PET 4 | | | 73.7 |
| PET 5 | 73.7 | | |
| PET 6 | | 73.7 | |
| Loxiol ® HOB 7119 | 0.5 | 0.5 | 0.5 |
| LCP1 | 2.5 | 2.5 | 2.5 |
| Polymer A | 10 | 10 | 10 |
| Irganox ® 1010 | 0.3 | 0.3 | 0.3 |
| Vansil ® HR325 | 10 | 10 | 10 |
| Plasthall ® 809 | 3 | 3 | 3 |
| Instrumented impact, J | | | |
| 4 min HUT | 51.1 | 4.7 | 7.0 |
| 15 min HUT | 51.6 | 6.7 | 12.1 |
| Viscosity, Pa · s | | | |
| 330 sec. HUT | 200 | 115 | 127 |
| 630 | 212 | 142 | 164 |
| 930 | 225 | 164 | 201 |
| 1230 | 232 | 168 | 226 |
| 1530 | 237 | 167 | 243 |

Examples 11-12 and Comparative Example B

The compositions shown in Table 6 were prepared by Compounding Method A. They were then tested for melt viscosity and instrumented impact. Results are also given in Table 6.

TABLE 6

| Example | B | 11 | 12 |
|---|---|---|---|
| PET 8 | 73.8 | | |
| PET 3 | | 73.8 | 71.3 |
| LCP 1 | | | 2.5 |
| Polymer A | 15 | 15 | 15 |
| Licowax ® PE 520 | 0.5 | 0.5 | 0.5 |
| Nyglos ® 4 | 5.2 | 5.2 | 5.2 |
| Plasthall ® 809 | 3 | 3 | 3 |
| Ketjenblack ® EC600JD | 2.5 | 2.5 | 2.5 |
| Melt Viscosity (Pa · s) | | | |
| 5.5 min HUT | 316 | 417 | 389 |
| 10.5 | 299 | 403 | 417 |
| 15.5 | 261 | 407 | 421 |
| 20.5 | 226 | 422 | 417 |
| 25.5 | 203 | 411 | 414 |
| Instrumented impact, J | | | |
| 4 min HUT | 24.5 | 39.7 | 27.6 |
| 15 min | 3.2 | 43.7 | 31.5 |

Examples 13-19

The compositions shown in Table 7 were prepared by Compounding Method A. They were then tested for melt viscosity and instrumented impact. Results are also given in Table 7. These results show that PET made with titanium catalysts are similar to PET made with germanium catalysts, i.e., their toughened compositions do not readily lose their toughness at elevated temperature.

TABLE 7

| | Example | | | | | | |
|---|---|---|---|---|---|---|---|
| | 13 | 14 | 15 | 16 | 17 | 18 | 19 |
| PET 9 | 88.2 | 85.2 | 83.2 | 81.2 | | | |
| PET 10 | | | | | 85.2 | 83.2 | 81.2 |
| Polymer A | 8 | 6 | 8 | 10 | 6 | 8 | 10 |
| Irganox ® 1010 | 0.1 | 0.1 | 0.1 | 0.1 | 0.1 | 0.1 | 0.1 |
| Ultranox ® 626 | 0.2 | 0.2 | 0.2 | 0.2 | 0.2 | 0.2 | 0.2 |
| Vansil ® HR325 wollastonite | 0.0 | 5.0 | 5.0 | 5.0 | 5.0 | 5.0 | 5.0 |
| Loxiol ® HOB7119 | 0.5 | 0.5 | 0.5 | 0.5 | 0.5 | 0.5 | 0.5 |
| Plasthall ® 809 | 3 | 3 | 3 | 3 | 3 | 3 | 3 |
| Instrumented Impact, J | 38.7 | 49.1 | 66.5 | 78.1 | 51.1 | 57.8 | 76.9 |
| Instrumented Impact, J, STD DEV | 16.8 | 32.4 | 24.7 | 1.0 | 30.6 | 34.6 | 1.2 |
| Peak Force, kg | 387 | 453 | 495 | 471 | 479 | 423 | 467 |
| Instrumented Impact, J, 15 min HUT | 57.6 | 87.3 | 83.0 | 82.0 | 72.8 | 85.1 | 76.4 |
| Instrumented Impact, J, 15 min HUT, STD DEV | 9.8 | 2.7 | 1.2 | 1.1 | 24.0 | 1.1 | 4.5 |

TABLE 7-continued

| | Example | | | | | | |
|---|---|---|---|---|---|---|---|
| | 13 | 14 | 15 | 16 | 17 | 18 | 19 |
| Peak Force, kg, 15 min HUT | 481 | 538 | 503 | 489 | 515 | 515 | 473 |
| Melt Viscosity, Pa sec, 295° C. | 134 | 109 | 139 | 156 | 118 | 131 | 152 |
| MV Loss @ 295° C., %/min | 1.21% | 1.03% | 0.40% | 0.03% | 1.55% | 1.29% | 0.93% |

What is claimed is:

1. A toughened poly(ethylene terephthalate) composition which comprises a functionalized polymeric toughener dispersed in a continuous matrix of said poly(ethylene terephthalate) wherein said improvement comprises said poly(ethylene terephthalate) contains less than 25 ppm of antimony.

2. The composition as recited in claim 1 wherein said poly(ethylene terephthalate) has a melting point of about 240° C. or more, and a weight average molecular weight of about 20,000 or more.

3. The composition as recited in claim 1 wherein said toughener comprises epoxy or carboxylic anhydride groups.

4. The composition as recited in claim 1 wherein said toughener is a copolymer of ethylene and one or more (meth)acrylate monomers.

5. The composition as recited in claim 4 wherein said toughener comprises epoxy groups.

6. The composition as recited in claim 1 wherein said toughener is about 3 to about 25 percent by weight of the total composition.

7. The composition as recited in claim 1 additionally comprising 1 to about 70 weight percent of filler/reinforcing agent based on the total weight of the composition.

8. A shaped part comprising the composition of claim 1.

9. The shaped part as recited in claim 8 which is an appearance part.

10. The composition of claim 1 wherein the poly(ethylene terephthalate) contains less than 10 ppm antimony.

11. A process for melt forming into a shaped part a toughened poly(ethylene terephthalate) composition which comprises a functionalized polymeric toughener dispersed in a continuous matrix of said poly(ethylene terephthalate) wherein said improvement comprises said poly(ethylene terephthalate) contains less than 25 ppm of antimony.

12. The process as recited in claim 11 wherein said poly(ethylene terephthalate) has a melting point of about 240° C. or more, and a weight average molecular weight of about 20,000 or more.

13. The process as recited in claim 11 wherein said toughener comprises epoxy or carboxylic anhydride groups.

14. The process as recited in claim 11 wherein said toughener is a copolymer of ethylene and one or more (meth)acrylate monomers.

15. The process as recited in claim 14 wherein said toughener comprises epoxy groups.

16. The process as recited in claim 11 wherein said toughener is about 3 to about 25 percent by weight of the total composition.

17. The process as recited in claim 11 additionally comprising 1 to about 70 weight percent of filler/reinforcing agent based on the total weight of the composition.

18. The process as recited in claim 11 wherein one or more active ingredients, and optionally one or more inactive ingredients, are to be mixed in to form said composition, comprising the step of:

(a) a first mixing step comprising mixing said polymer and said toughener;

(b) in a second mixing or subsequent mixing step mixing the product of step (a) with said one or more active ingredients;

provided that any inactive ingredients to be mixed in are mixed in during the first and/or second or subsequent mixing steps.

19. The process as recited in claim 11 wherein said poly(ethylene terephthalate) contains less than 10 ppm antimony.

* * * * *